3,161,658
TRIMELLITIC ACID RECOVERY AND CONVERSION TO ANHYDRIDE
Delbert H. Meyer, Highland, Ind., assignor to Standard Oil Company, Chicago, Ill., a corporation of Indiana
No Drawing. Filed Nov. 15, 1961, Ser. No. 152,617
7 Claims. (Cl. 260—346.3)

This invention relates to the recovery of trimellitic acid from the liquid phase oxidation of 1,2,4-trialkylbenzene with gaseous oxygen in the presence of acetic acid and more particularly pertains to the recovery of trimellitic acid as its intramolecular anhydride from said oxidation process.

To date, the only commercially feasible liquid phase oxdiation process for the production of trimellitic acid is the oxidation of 1,2,4-trialkylbenzene with gaseous oxygen, preferably air, in the presence of acetic acid and a catalyst system provided by a heavy metal and bromine. Acceptable commercial oxidations can be carried out at temperatures in the range of 325 to 460° F. and pressures to maintain a liquid phase. Suitable pressures for commercial operation are in the range of 300 to 500 pounds per square inch (p.s.i.g.). The oxidation of 1,2,4-trialkylbenzenes can be accomplished at lower temperatures than 325° F., as low as 120° F., with pure or commercial oxygen but air is by far the most conveniently available for commercial practice. Pressures below 300 p.s.i.g. can be employed at the lower temperatures or even at 325 to 460° F. with elaborate solvent recovery and recycle systems associated with the oxidation reactor. Pressures above 500 p.s.i.g. can also be employed but unnecessarily complicate the fabrication of the oxidation reaction vessel.

The preferred 1,2,4-trialkylbenzene is pseudocumene, 1,2,4-trimethylbenzene, because it is more readily available and because it requires less oxygen than the higher trialkylbenzenes such as triethyl, tripropyl, triisopropyl, etc., benzenes. For the commercial oxidation of pseudocumene or $C_9$ aromatic fractions containing 90 to 99% pseudocumene in the foregoing liquid phase oxidation at 325 to 460° F. and 300 to 500 p.s.i.g., it is preferred to employ from 2 to 5 parts of acetic acid, 90 to 100% strength, per part of $C_9$ aromatic hydrocarbon containing pseudocumene. By the proper selection of heavy metal concentration and bromine concentration based on the $C_9$ aromatic fraction containing pseudocumene the pseudocumene can be converted to trimellitic acid in yields of from 80 up to about 90 percent of theory. The remaining pseudocumene is converted to oxidation intermediates such as methyl phthalic acids and dicarboxybenzaldehydes and to oxidation byproducts of high molecular weight, up to 500, containing mainly only two aromatic rings and up to four and five carboxy groups. Such aromatic oxidation by-products as benzylpentacarboxylic acid, benzophenone pentacarboxylic acid, benzophenone tetracarboxylic acid, and biphenyl pentacarboxylic acid have been identified. The presence of even substituted 2-hydroxy-benzophenones has been indicated. Also present are o, m and p-phthalic acids either formed by the co-oxidation of dialkylbenzenes or by decomposition of benzene tricarboxylic acids.

The catalyst system can be provided by the use of a heavy transitional metal selected from metals having atomic numbers of 13, 21 to 32, 39 to 51, 57 to 84, all inclusive and the actinide earths. The metals may be added in elemental form or as a soluble salt such as a chloride, bromide, acetate, nitrate, a chelate or as a part of an inorganic acid radical such as a chromate, vanadate, molybdate, etc. Of the heavy metals cobalt, manganese and mixtures of these two alone or together with cerium are preferred. Likewise, bromine may be added as elemental or molecular bromine ($Br_2$), or as an inorganic bromide such as HBr, sodium bromide, potassium bromate, ammonium bromide, nickel bromide, manganese bromide, cobalt bromide (the latter three will, of course, provide both heavy transitional metal and bromine) and organic bromides such as dibromoethane, tribromoethane, tetrabromoethane, bromoform, benzyl bromide, etc.

The ratios of heavy metal and bromine to $C_9$ aromatic hydrocarbon containing pseudocumene hereinbefore forecast as being exceptionally useful are best expressed in weight concentration of the metals themselves and weight concentration of Br based on said $C_9$ aromatic fraction. These concentrations are from 0.25 to 0.90 weight percent total metal, for example, calculated as $Co^{++}$ or $Mn^{++}$ or a combination thereof such as 0.10 $Co^{++}$ and 0.15 $Mn^{++}$ or 0.35 $Co^{++}$ and 0.55 $Mn^{++}$ or 0.2 $Co^{++}$ with 0.5 $Mn^{++}$ and 0.2 Ce percent by weight based on the $C_9$ aromatic hydrocarbon. Suitable bromine concentrations on the same weight percent basis are in the range of 0.4 to 1.1%.

The commercial liquid phase oxidation reactions are generally carried out in a tubular reactor with or without internal stirring. The oxidation charge is usually about 0.3 to 0.7 of the oxidation vessel volume and expands upon introduction of air to take up from 0.6 to substantially all of the volume of the oxidation vessel, since pressurized air is introduced into the bottom of the oxidation vessel. Air can be introduced into the oxidation vessel at the rate of 45 to 600 standard cubic feet per hour (measured at 77° F. and one atmosphere) per pound of $C_9$ aromatic hydrocarbon fraction containing pseudocumene. Reaction periods of from 15 to 90 minutes may be established for commercial practice.

Unlike insoluble iso- and tere-phthalic acids prepared by liquid phase oxidations of meta- and para-dialkylbenzenes with air in acetic acid solvent, trimellitic acid is quite soluble in acetic acid. It appears that the solubility of trimellitic acid is increased in acetic acid and especially the acetic acid containing water formed by the oxidation by the presence of aromatic intermediates and by-products of oxidation which are also soluble in acetic acid. It is, of course, desirable to recover from the oxidation reactor effluent as much of the trimellitic acid produced by the oxidation reaction as is commercially feasible. It is preferred to recover trimellitic acid as its intramolecular anhydride with an anhydride content of at least 95% and a purity of at least 95%.

Trimellitic acid is reported in the literature as dehydrating to the intramolecular anhydride at 216° C. However, by techniques described in U.S. Patent 2,971,011, trimellitic anhydride can be dehydrated to its intramolecular anhydride at temperatures as low as 170° C. (338° F.) at a rapid rate by an inert gas stream carrying away water vapor formed by the dehydration. The inert gas need only be inert to the anhydride at the dehydration temperatures involved since the inert gas can be even passed through the molten mixture of anhydride and tricarboxylic acid. Nitrogen, flue gas, carbon dioxide, hydrocarbon vapors added per se or generated in situ by combining liquid hydrocarbons with trimellitic acid to be dehydrated are useful. Trimellitic acid can be dehydrated and its anhydride stripped from the dehydration zone by steam in a manner similar to steam distillation except the gaseous mixtures of anhydride and water-vapor is passed through a hot condenser operated at a minimum temperature equal to the melting point of the anhydride, 334° F. at atmospheric pressure, to condense only the anhydride vapors and permit the steam to pass on through. Either dehydration can be carried out at pressures of from 50 to 900 mm. Hg absolute in commercial operations.

After oxidation of the 1,2,4-trialkylbenzene such as pseudocumene in the oxidation reactor as hereinbefore described, the reactor effluent is processed to recover trimellitic acid. One method for recovery of trimellitic acid from the reactor effluent is to crystallize trimellitic acid from the acetic acid solvent. The mixture in the reactor may be partially depresusrized from 380 to 400 p.s.i.g. to a pressure in the range of from 50 to 150 p.s.i.g. and then discharged into the crystallization zone wherein cooling can be accomplished by internal cooling or by flashing off acetic acid solvent at further reduced pressure in one or more stages. By one specific method of operation depressurized reactor effluent at 100 p.s.i.g. can be successively flashed to atmospheric pressure in one stage and to subatmospheric pressure in a second stage to affect cooling for crystallization. The solvent flashed off during cooling can be condensed and returned to the crystallizer or a portion, up to about 50 to 60%, of the acetic acid solvent may be removed to affect both cooling and concentration. Even upon cooling the reactor effluent or a concentrated reactor effluent to about 100° F., a substantial amount of trimellitic acid remains in solution. For example, when a reactor effluent containing 500 pounds acetic acid solvent, 200 pounds trimellitic acid, 50 pounds of aromatic intermediates and by-products of oxidation, together with the components of the catalyst system is cooled to about 100° F. to crystallize trimellitic acid therefrom, there remains dissolved in the acetic acid solvent 65 pounds of trimellitic acid, 32.5% of that formed in the oxidation step. By concentrating the reactor effluent so that it contains about 50% of the acetic acid solvent, i.e., 250 pounds acetic acid solvent, 200 pounds trimellitic acid, 50 pounds aromatic intermediates and by-products of oxidation with the catalyst component, there would still remain in the mother liquor following filtration about 30 to 35 pounds trimellitic acid, 15 to 17.5% of that formed in the oxidation step. The operation of a commercial installation for the preparation of trimellitic acid and/or its anhydride requires that the acetic acid employed in the oxidation reaction be recovered for recycle and reuse in as high yields as are economically feasible employing best engineering practices. Thus, the acetic acid solvent in the mother liquor, after the solid liquid phase separation recovery of trimellitic acid from the reactor effluent by crystallization, must also be subjected to a processing step for the removal of acetic acid, generally as wet acetic acid which is sent to an acetic acid dehydration step to recover for reuse and recycle acetic acid of the strength of 95 to 100%. Stripping of the wet acetic acid from the mother liquor, of course, leaves a residue containing trimellitic acid, aromatic intermediates and by-products of oxidation and the catalyst components, mainly containing the heavy metal components of the catalyst system. Such a residue, hereinafter sometimes referred to as mother liquor stripper bottoms, can be maintained in the fluid form only at relatively high temperatures, i.e., from 250 to about 525° F. Although these residues are fluid at such temperatures, they have an exceptionally high viscosity varying from 45 to 1300 centipoises depending upon the degree of shear rate of the fluid as, for example, by stirring, pumping, etc. During the stripping of the wet acetic acid from the mother liquor, a portion of trimellitic acid is converted to its anhydride. It would be thought that upon further heating of the mother liquor stripper bottoms substantially all of the trimellitic acid would be converted to its anhydride and distilled from the residue. However, because of the high viscosity of the residue, the heat input necessary to derive more than 30 to 50% of the anhydride content causes the remaining mass to char and thus the trimellitic acid values therein are substantially lost.

A process has been devised whereby 90% or more of the trimellitic acid product in the oxidation reaction can be recovered from the oxidation reactor effluent in a form suitable to be dehydrated into high quality trimellitic anhydride product. Since the recoverey of from 50 to 80% of the trimellitic acid from the reactor effluent can be accomplished by crystallizing trimellitic acid from the effluent and filtering the slurry thus formed, the process of this invention involves a novel recovery of trimellitic acid as its anhydride from the mother liquor obtained from the hereinbefore described crystallization techniques applied to the oxidation reaction effluent and the recovery of trimellitic acid solids from the resulting slurry. A significant advantage of the process of this invention is that it provides for the removal especially of metals, isophthalic acid and terephthalic acid prior to the recovery of anhydride product by distillation. According to the present invention, the mother liquor is fed continuously into a pool of molten trimellitic anhydride maintained at a temperature in the range of 330 to 450° F. The wet acetic acid in the mother liquor is flashed off at this temperature and is taken as an overhead stream with or without cooling to condense the vapors and sent to the acetic acid dehydration and recovery steps. Periodically a portion of the pool of trimellitic anhydride is removed and combined with a solvent to extract from the mixture trimellitic anhydride leaving an undissolved residue containing aromatic intermediates and by-products of oxidation and the metallic components of the catalyst. Such selective solvents for extracting the trimellitic anhydride include a ketone such as acetone, methylethyl ketone, and the like or the solvent may be aromatic hydrocarbon such as xylene or pseudocumene. Sufficient solvent is employed to extract the trimellitic anhydride. Commercial mixed xylenes will dissolve for each 100 grams of xylene from 11.6 to 65 grams of anhydride at temperatures of from 140 to 200° C. The solubility of trimellitic anhydride in pseudocumene is of substantially the same magnitude. Acetone and methylethyl ketone have an appreciable high solvent capacity for trimellitic anhydride. These ketones being somewhat lower boiling than the aromatic hydrocarbons hereinbefore mentioned will require the use of higher initial super-atmospheric pressure to maintain them in liquid phase when combined with the hot molten trimellitic anhydride. The ketones may be used at atmospheric pressure when the trimellitic anhydride removed from the pool is first solidified and then extracted with the ketone at ambient temperature up to the boiling point of the ketone. Ketones and aromatic hydrocarbons are preferred as extracting solvents since they do not react with trimellitic anhydride and, in general, they appear to be highly selective in dissolving trimellitic anhydride. These solvents do not dissolve the oxidation intermediates and by-products or the metallic components of the catalyst system which may be in the form of metal salts of trimellitic anhydride, i.e., having reacted with carboxyl group not involved in the anhydride ring, or they may be in the form of metal salts of trimellitic acid or in the form of metal salts of the aromatic intermediates and by-products of the oxidation.

A minimum of solvent is employed so that the extract solution is substantially saturated with respect to trimellitic anhydride. This solution is separated from the insoluble materials by some means suitable for separating a liquid phase from a solid phase such as by filtration or by centrifugation or decantation. The unextracted solids are then sent to recover the metals therefrom or to waste disposal. The solution substantially saturated with respect to trimellitic anhydride is then heated to remove the solvent as by distillation or evaporation and the solvent recovered for further extraction of trimellitic anhydride. The trimellitic anhydride remaining after removal of the ketone or aromatic hydrocarbon solvent can be charged as a solid with the trimellitic acid recovered by filtration of the crystalline slurry obtained from the oxidation reaction effluent to the dehydration of the crystalline trimellitic acid or can be melted and combined with the crude trimellitic anhydride obtained by the dehydration of the trimellitic acid solids recovered by crystallization and phase separation applied to the oxidation reaction effluent which also produce the mother liquor. In any event, the combined anhydrides are fractionated to obtain a high quality, 95% or better, trimellitic anhydride. The bottoms from this fractionation may be discarded or recycled to the extracting step.

The process of this invention can be illustrated by the following examples wherein all "parts" are parts by weight.

To obtain the mother liquor to be used in the process of this invention, the liquid reaction effluent from the oxidation of a pseudocumene feedstock (95% pseudocumene) with air in the presence of 3.5 parts of acetic acid per part of feedstock and in the presence of manganese acetate, cobalt acetate, ammonium bromide and tetrabromoethane to provide the catalyst system at 375 to 395° F. and 400 p.s.i.g. pressure is cooled to 100° F. The resulting slurry of trimellitic acid is filtered to recover the crystallized trimellitic acid and to recover the mother liquor.

*Example I*

The foregoing mother liquor is added continuously to a pool of molten crude trimellitic anhydride, about 100 parts maintained at 350° F. in a vessel fitted with a heated liquid draw off line, a hot knock-back condenser operated at a minimum temperature of 335° F., to condense trimellitic anhydride vapors, a vapor transfer line from the top of the hot knock-back condenser to transfer the vapors to an acetic acid dehydration column where 97% acetic acid is withdrawn for recycle to the oxidation reaction. When the liquid residue in the vessel accumulates to about three times the original volume, liquid residue is withdrawn to maintain about 150–200 grams of liquid in said vessel. A portion of the removed liquid is solidified. By analysis it is found that the solid contains 55% trimellitic anhydride. The solidified trimellitic anhydride containing material is ground and 200 parts of the ground solid is slurried with 400 parts of acetone at ambient room temperature for 60 minutes. The resulting slurry is filtered. The acetone extract solution (filtrate) is reserved for processing as hereinafter described. The filter cake is dried and amounts to 15.8 parts. Analysis of the dry filter cake is accomplished by first converting the organic acids in a portion of the cake to their methylesters followed by gas chromatography analysis of the resulting ester product. Another portion of the dried filter cake was subjected to X-ray fluorescence for metals content determination. By these analytical procedures it is found that the dry cake contains 0.3% orthophthalic acid, 6.3% isophthalic and terephthalic acids, 2.3% pseudocumene intermediate oxidation products, 52.2% trimellitic anhydride, and 2.6% trimesic acid, 3.06% cobalt and 3.3% manganese. The remainder of the filter cake comprises higher molecular weight oxidation by-products hereinbefore described.

The filtrate from the hereinbefore described extraction is dried by evaporation to remove the acetone and the residue from this evaporation is distilled at 6 mm. Hg whereby 84.7 parts of trimellitic anhydride condensate is recovered containing 74.6 parts of trimellitic anhydride. This represents 67% of the anhydride content of the 200 parts of ground solid employed in extraction step.

Thus, where 67.5% of the trimellitic acid is recovered from the oxidation reaction effluent by crystallization and filtration, the above described process provides for a total recovery of about 90%.

*Example II*

The hereinbefore described oxidation reaction effluent containing for each 500 parts of acetic acid solvent 200 parts of trimellitic acid, 50 parts of pseudocumene intermediates and by-products of oxidation together with residues of the catalyst components when cooled to 100° F. to crystallize trimellitic acid and filtered yields, on an hourly basis, a dried filter cake containing 135 parts of trimellitic acid per 500 parts of acetic acid solvent. The mother liquor is continuously fed to a flash system, as hereinbefore described, wherein a molten pool of trimellitic anhydride is maintained in the receiving vessel at 350–375° F. The hot knockback condenser is operated at 340° F. There is withdrawn from the receiving vessel an amount of liquid by weight equivalent to the weight of the solids charged thereto in the mother liquor. The withdrawn liquid is solidified at about 100° F., ground and slurried with 200 parts of acetone per 100 parts of solid for 50 minutes. The resulting mixture is cooled to 75° F. and filtered. The acetone solution is continuously combined with the trimellitic acid filter cake in a dehydration vessel wherein acetone is flashed off and trimellitic acid is converted to its intramolecular anhydride at 350° F. The acetone vapors provide the inert gas sweep hereinbefore described. Molten crude trimellitic anhydride is continuously withdrawn from the dehydration vessel and charged to a simple or flash distillation system operated at about 6 mm. Hg and wherein additional heat is supplied to drive a trimellitic anhydride product overhead leaving behind higher boiling materials. The trimellitic anhydride overhead stream is condensed to recover a liquid stream which is sent through heated transfer lines to a flaker and then bagged. Flaked trimellitic anhydride product of about 95% anhydride content and 95% purity may be recovered in yields of about 90% based on the trimellitic acid in the oxidation reaction effluent.

*Example III*

The process of Example II is repeated except the anhydride containing liquid (350–375° F.) withdrawn from the molten pool in the receiving vessel wherein wet acetic acid is flashed from the mother liquor, is added to pseudocumene in the ratio of 800 parts of pseudocumene per 300 parts of liquid anhydride containing material. This mixture is stirred and held at about 350° F. for 15 to 20 minutes, filtered to remove an insoluble oily residue. The resulting filtrate is cooled to 75° F. whereupon a trimellitic anhydride product forms as a crystalline precipitate which may be recovered by filtration, centrifugation, decantation, etc. The wet crystalline product is preferably washed with pentane to remove pseudocumene. The washed crystalline anhydride can be dried but need not be before adding it to either the trimellitic acid first recovered before adding to a melter-dehydrator or can be separately added to the melter-dehydrator. The resulting crude trimellitic anhydride is withdrawn from the melter-dehydrator and flashed at reduced pressure. In this manner there may be obtained 85 to 90% trimellitic anhydride equivalent of the trimellitic acid in the oxidation effluent as an anhydride product of 95% anhydride content and 95% or better purity.

Commercial xylene can be used to extract trimellitic anhydride from the impurities associated therewith in the mother liquor following flashing off the wet acetic acid. Trimellitic anhydride is soluble in the range of 20 to 65 parts per 100 parts of xylene at 160 to 200° C.

The amount of extracting solvent employed to dissolve trimellitic anhydride from the mixture also containing the intermediates and by-products of oxidation may be varied over a wide range. However, it is desirable from a materials handling basis to employ only enough to dissolve substantially all of the anhydride at the extraction temperature or at the temperature most advantageous for filtration to remove the insolubles containing a major portion of the intermediates and by-products of oxidation.

What is claimed is:

1. In the process for producing trimellitic anhydride by the steps of oxidizing in a reaction zone in which a liquid phase is maintained 1,2,4-trialkylbenzene with air in the presence of acetic acid in an amount of from 3 to 5 parts by weight based on said trialkylbenzene and in the presence of a catalyst system comprising bromine and a heavy metal oxidation catalyst, cooling the reaction effluent to crystallize trimellitic acid therefrom, separating the crystallized solid trimellitic acid from the acetic acid mother liquor containing dissolved trimellitic acid and recovering separately solid trimellitic acid and the acetic acid mother liquor, dehydrating said trimellitic acid to its anhydride, and fractionating said trimellitic anhydride to recover high purity trimellitic anhydride; the improvement which comprises: adding said acetic acid mother liquor containing dissolved trimellitic acid to a molten pool of trimellitic anhydride at a temperature of from 330 to 450° F. to flash off water and acetic acid, withdrawing a portion of said pool of molten trimellitic anhydride and combining it with a solvent selected from the group consisting of dialkyl ketones and aromatic hydrocarbons to form a solution of trimellitic anhydride in said solvent substantially saturated with respect thereto, separating said solution from the insoluble residue, recovering crude trimellitic anhydride from said solution, adding said crude trimellitic anhydride to the anhydride obtained by dehydration of the first recovered crystallized trimellitic acid, and fractionating said mixture of trimellitic anhydride to obtain a purified trimellitic anhydride of at least 99% purity.

2. The process of claim 1 wherein the extracting solvent is acetone.

3. The process of claim 1 wherein the extracting solvent is xylene.

4. The process of claim 1 wherein the extracting solvent is pseudocumene.

5. The process for recovery of trimellitic anhydride from the liquid phase oxidation of pseudocumene in an oxidation zone with air in the presence of 2 to 5 parts of acetic acid per part of pseudocumene by weight and in the presence of a catalyst system containing cobalt, manganese and bromine at a temperature in the range of from 325 to 460° F. and at a pressure in the range of from 300 to 500 p.s.i.g. to form a liquid oxidation reaction mixture containing trimellitic acid which comprises cooling the liquid oxidation reactor effluent to crystallize trimellitic acid, separating crystalline trimellitic acid from the mother liquor, continuously feeding said mother liquor into a pool of trimellitic anhydride at a temperature of from 330 to 450° F. thereby flashing off water and acetic acid and converting the trimellitic acid contained in said mother liquor to trimellitic anhydride, continuously withdrawing a portion of said pool equivalent in weight to the solid contents of said mother liquor, extracting said withdrawn material with acetone in an amount sufficient to dissolve trimellitic anhydride as a substantially saturated solution thereof, separating said acetone solution from the undissolved material, recovering trimellitic anhydride from said solution, combining the trimellitic anhydride so recovered with the crystalline trimellitic acid, thermally converting said trimellitic acid to its anhydride thereby forming a crude trimellitic anhydride mixture, and recovering trimellitic anhydride product from said anhydride mixture.

6. The process for recovery of trimellitic anhydride from the liquid phase oxidation of pseudocumene in an oxidation zone with air in the presence of 2 to 5 parts of acetic acid per part of pseudocumene by weight and in the presence of a catalyst system containing cobalt, manganese and bromine at a temperature in the range of from 325 to 460° F. and at a pressure in the range of from 300 to 500 p.s.i.g. to form a liquid oxidation reaction mixture containing trimellitic acid which comprises cooling the liquid oxidation ractor effluent to crystallize trimellitic acid, separating crystalline trimellitic acid from the mother liquor, continuously feeding said mother liquor into a pool of trimellitic anhydride at a temperature of from 330 to 450° F. thereby flashing off water and acetic acid and converting the trimellitic acid contained in said mother liquor to trimellitic anhydride, continuously withdrawing a portion of said pool equivalent in weight to the solid contents of said mother liquor, extracting said withdrawn material with acetone in an amount sufficient to dissolve trimellitic anhydride as a substantially saturated solution thereof, separating said acetone solution from the undissolved material, adding said acetone oslution to a dehydration zone wherein said crystalline trimellitic acid is charged for the thermal conversion thereof to its anhydride and recovering from the anhydride in said dehydration zone a trimellitic anhydride product by distillation.

7. The process for recovery of trimellitic anhydride from the liquid phase oxidation of pseudocumene in an oxidation zone with air in the presence of 2 to 5 parts of acetic acid per part of pseudocumene by weight and in the presence of a catalyst system containing cobalt, manganese and bromine at a temperature in the range of from 325 to 460° F. and at a pressure in the range of from 300 to 500 p.s.i.g. to form a liquid oxidation reaction mixture containing trimellitic acid which comprises cooling the liquid oxidation reactor effluent to crystallize trimellitic acid, separating crystalline trimellitic acid from the mother liquor, continuously feeding said mother liquor into a pool of trimellitic anhydride at a temperature of from 330 to 450° F. thereby flashing off water and acetic acid and converting the trimellitic acid contained in said mother liquor to trimellitic anhydride, combining the said withdrawn material with pseudocumene in the ratio of from 1 to 3 parts thereof per part of said withdrawn material at a temperature in the range of 330 to 360° F. thereby extracting trimellitic anhydride from said withdrawn material, separating the pseudocumene solution from the undissolved material, adding said pseudocumene solution to a dehydration zone wherein said crystalline trimellitic acid is thermally converted to its anhydride whereby a crude trimellitic anhydride mixture is formed, and recovering a trimellitic anhydride product by distillation of said anhydride mixture.

No references cited.